United States Patent [19]

Dorsic

[11] 4,303,047
[45] Dec. 1, 1981

[54] DOUBLE THROTTLE VALVE CARBURATOR

[76] Inventor: Josef Dorsic, 13603 Allerton St., Whittier, Calif. 90605

[21] Appl. No.: 128,594

[22] Filed: Mar. 10, 1980

[51] Int. Cl.³ ............................................. F02M 23/04
[52] U.S. Cl. .................................... 123/327; 123/585; 123/587; 261/63; 261/DIG. 19
[58] Field of Search ........................ 123/585, 587, 327; 261/DIG. 19, 41 D, 43, 63

[56] References Cited

U.S. PATENT DOCUMENTS

| | | | |
|---|---|---|---|
| 1,221,536 | 4/1917 | Hopkins | 123/587 |
| 1,547,278 | 7/1925 | Whytehead | 123/587 |
| 2,207,152 | 7/1940 | Huber | 123/587 |
| 3,371,914 | 3/1968 | Walker | 261/DIG. 19 |
| 4,194,477 | 3/1980 | Sugiyama | 123/587 |

Primary Examiner—Ronald H. Lazarus
Attorney, Agent, or Firm—Dominick Nardelli

[57] ABSTRACT

In combination with a standard carburator for an internal combustion engine having a butterfly type throttle valve, a means is provided having a passageway with another butterfly type valve and the means is disposed between the carburator and the engine wherein the added valve rotates about an axis disposed normal to the axis of rotation of the throttle valve. Linkage means are provided so that both valves open and close together. A cylindrical chamber is provided with one end opened to the atmosphere and a piston is disposed slideably therein. A compression spring within the chamber urges the piston towards the open end to seat against an internal shoulder formed in the cylinder. Two ducts are provided whereby one end of each duct communicates with the passageway in the means, upstream of the valve therein, and one end of the other duct communicates with the passageway downstream of the valve. The duct with its end upstream of the valve has its other end communicating adjacent the shoulder but within the chamber so that atmospheric pressure can be sealed off from this end of the duct. The other duct has its other end communicating within the chamber. Means are provided to adjust the urging force of the compression spring so that the engine and means are made compatable.

3 Claims, 3 Drawing Figures

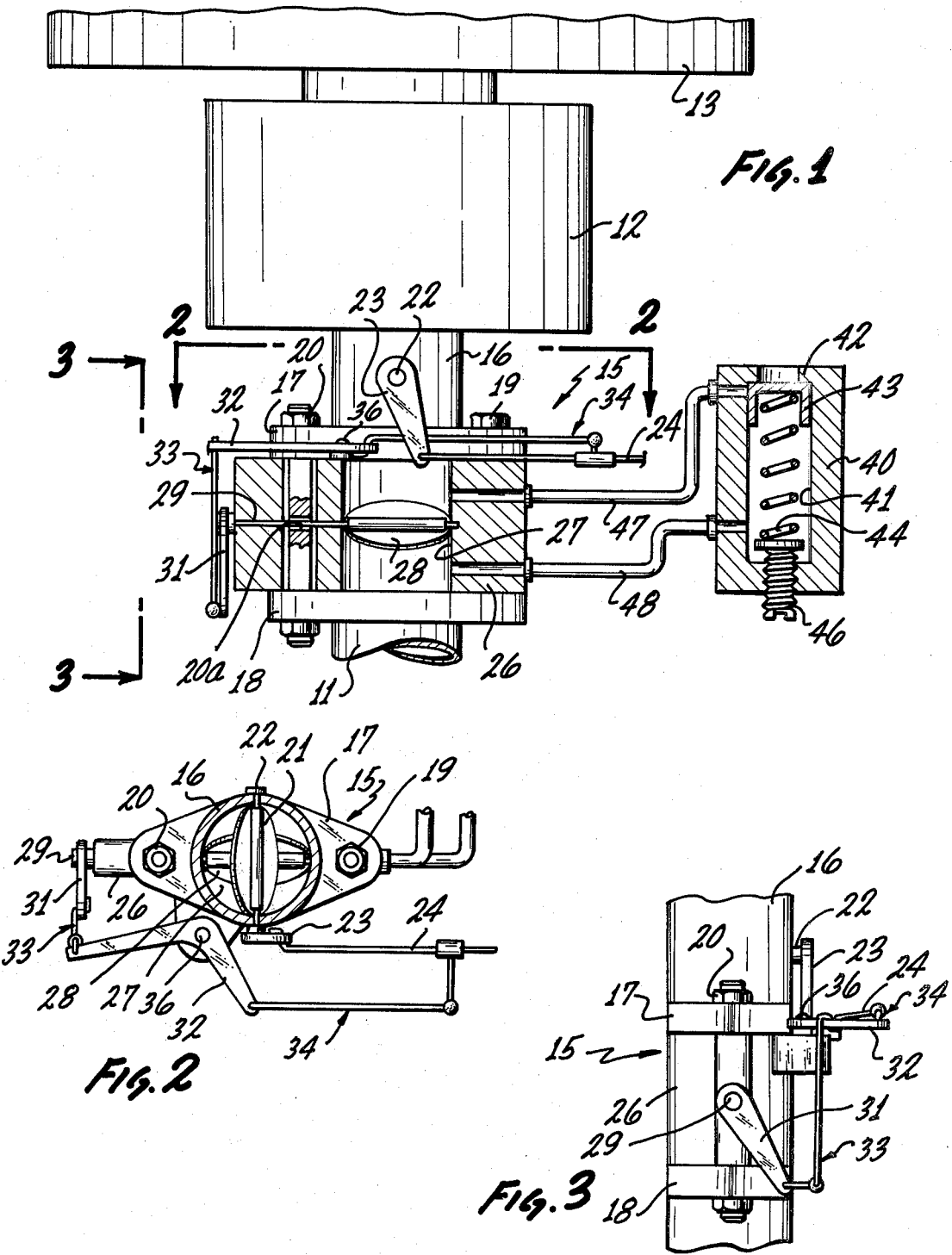

DOUBLE THROTTLE VALVE CARBURATOR

FIELD OF THE INVENTION

This invention relates to carburation of the air supply to an internal combustion engine and more particularly to a more efficient carburation system.

BACKGROUND OF THE INVENTION

Standard carburators as used on internal combustion engines have a venturi whereby the high speed air drawn into the engine sucks up fuel. The speed of the air is naturally governed by the position of a butterfly type throttle valve and, in turn, the engine speed. However when the engine is decelerating the throttle valve is almost closed and, in turn, the absolute pressure of the gases in the engine cylinders is very low, whereby the engine decelerates relatively slow.

OBJECTS OF THE INVENTION

An object of this invention is to provide a means to improve the efficiency of an internal combustion engine.

Another object of this invention is increase the braking effect of an internal combustion engine during deceleration.

These and other objects and features of advantage will become more apparent after studying the following description together with the accompanying drawing of the preferred embodiment of my invention.

BRIEF DESCRIPTION OF THE DRAWING

FIG. 1 is a schematic, block type drawing showing in elevation, an air cleaner, a standard carburator, my novel means and the intake end of a manifold for an internal combustion engine;

FIG. 2 is a sectional view taken on line 2—2 of FIG. 1 in the direction of the arrows; and FIG. 3 is a view taken on line 3—3 of FIG. 1 in the direction of the arrows.

DETAILED DESCRIPTION OF THE DRAWING

Referring to FIG. 1 of the drawing a standard internal combustion engine is schematically represented by the top intake end of its manifold 11. Although a down-draft carburator system will be described the principals of my invention also have utility in an up-draft carburator system. The engine is provided with a standard carburator 12 and an air cleaner 13 suitably coupled together.

Up to now one would have coupled the carburator 12 directly onto the manifold 11, but I have incorporated a novel means 15 therebetween whose description will follow. The carburator 12 of course has a tubular passageway 16 (more clearly shown in FIG. 2) attached to a flange 17 which up to now would have been directly fastened to a flange 18 on the manifold 11 by suitable bolts 19 & 20. The carburator has a butterfly valve 21 (more clearly shown in FIG. 2) disposed in passageway 16 which valve 21 rotates about a shaft 22 suitably journaled in the passageway. The shaft 22 has one of its exterior ends fixed to an arm 23 which is, in turn, coupled to an actuating rod 24 whose position is controlled by a suitable foot pedal (not shown) in a standard manner.

A detailed description of my novel means 15 will now follow. My means 15 has a body 26 shaped preferably as shown but not limited thereto. The body 26 has a passageway 27 disposed coaxial with and having the same inside diameter as passageway 16 and manifold 11, for obvious reasons. Within passageway 27 is disposed another butterfly type valve 28 which is fixed to a shaft 29 suitably journaled in body 26 so that it rotates about its own axis. As one observes in FIG. 2, shaft 22 which supports butterfly valve 21 in passageway 16 is at right angles to the shaft 29 which supports butterfly valve 28. In order to have the shafts 22 and 29 at right angles, the bolt 20 has a transverse hole 20a through which shaft 29 passes. Shaft 29 has its exterior end fixed to an arm 31, which is in turn coupled to a bell crank 32 (FIG. 2) through a suitable linkage 33. The other arm of the bell crank 32 is coupled by linkage 34 to actuating rod 24, whereby as rod 24 is actuated left and right as viewed in FIGS. 1 and 2 to open and close valve 21, the bell crank 32 pivots about pin 36 so that linkage 33 moves up and down (as viewed in FIG. 2) or moves into and out of the plane of the drawing (as viewed in FIG. 1) so that valve 28 also opens and closes. Besides having shafts 22 and 29 at right angles to each other linkages 33 and 34 have means to adjust the valves 21 and 28 to open and close together or in phase. One sees that as the mixture of air and fuel passes from the carburator 12 to the manifold, the gas mixture experiences a twisting motion and this twisting motion is believed to be one of the features that increases the efficiency of the engine.

The means 15 also increases the braking efficiency of the engine by selectively metering atmospheric air into the passageway 27. This is done by providing a closed end cylinder or hollow chamber 40, preferably separated from body 26. Chamber 40 has a cylinder well 41 which has an internal flange 42 formed at the open end. Within the chamber 41, a piston 43 is disposed to slide between the flange 42 and the closed end, but a compression spring 44 is provided to urge the piston 43 against the shoulder thereby forming a seal therebetween. As will become apparent hereinafter, an adjustment screw 46 is provided to match the force of the spring 44 to the particular engine to which the means 15 is mounted. Two tubes or ducts 47 and 48 communicate with chamber 41 and the passageway 27. Duct 47 has one end terminating just within the shoulder 42 so that when the piston 43 is urged thereagainst that end of duct 47 is sealed. The other end of duct 47 terminates in passageway 27 and between the two valves 21 and 28, or upstream of valve 28. Duct 48 has one end terminating within chamber 41 anywhere between the piston 43 and the closed end thereof so that during normal operation this end of duct 48 is not covered by the piston. The other end of duct 48 also terminates in passageway 27 and between valve 28 and manifold 11 or downstream of valve 28.

My novel means 15 operates in response to the differential in pressure between the region after valve 28 and atmospheric pressure. During idling speed the opening 42 should preferably remain close as not to affect the air to fuel ratio of the combustable mixture. This is the reason for adjustment screw 46. Whenever the vacuum in the manifold increases for example during deceleration, piston 43 is forced away from opening 42 and air enters the manifold through duct 47 to lean out the mixture and increase manifold pressure to improve deceleration. During running speed, the combustion mixture experiences a twisting effect to more uniformly mix the components.

Having described the preferred embodiment of my invention, one skilled in the art, after studying the above description, could devise other embodiments without departing from the spirit of my invention. Therefore my invention is not to be considered limited to the disclosed embodiment but includes all embodiments falling within the scope of the appended claims.

I claim:

1. In an intake system for an internal combustion engine having a carburator with a first passageway wherein is disposed a first butterfly type throttle valve and a venturi with a fuel nozzle, an air injector means comprising:
   a body having a second passageway aligned with said first passageway;
   a second butterfly type valve disposed within said second passageway and disposed to rotate about an axis normal to the axis of rotation of said first valve;
   linkage means coupled to both said valves so that both said valves open and close together;
   a cylinder having a well with one closed end and the other end opened to the atmosphere and having an internal flange at the open end;
   a piston disposed within said cylinder;
   a compression spring disposed within said cylinder to urge said piston against said internal flange;
   a first duct communicating with the region of said cylinder adjacent said shoulder and with said first and second passageways in the region between said first and second valves;
   a second duct communication with said cylinder and said second passageway in the region downstream and on the other side of said second valve, than the side which said first valve is disposed.

2. In the system of claim 1 wherein
an adjustment means is disposed at said closed end of said cylinder to adjust the force of said spring.

3. In the system of claim 1 wherein:
said cylinder is removed from said body; and
said first and second ducts are tubes.

* * * * *